United States Patent [19]

Pallos et al.

[11] 3,888,888

[45] June 10, 1975

[54] INSECTICIDAL ACTIVE GERANYL AND CITRONYL AMINE DERIVATIVES AND THEIR EPOXIDES

[75] Inventors: Ferenc M. Pallos, Walnut Creek; Julius J. Menn, Saratoga, both of Calif.

[73] Assignee: Stauffer Chemical Company, Westport, Conn.

[22] Filed: Apr. 5, 1973

[21] Appl. No.: 348,457

Related U.S. Application Data

[62] Division of Ser. No. 172,203, Aug. 16, 1971, abandoned.

[52] U.S. Cl.............. 260/348 A; 424/278; 424/314; 260/482 C
[51] Int. Cl............................................... C07d 1/22
[58] Field of Search...................... 260/240 H, 348 A

[56] References Cited
UNITED STATES PATENTS 3,513,176  5/1970  Andrews et al............. 260/240 H X
3,681,385  8/1972  Siddall............................. 260/327 E

*Primary Examiner*—John D. Randolph
*Attorney, Agent, or Firm*—Daniel C. Block

[57] ABSTRACT

Compound having the formula

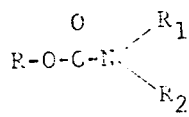

wherein R can be selected from the group consisting of lower alkyl, having from 3 to about 8 carbon atoms, alkenyl, haloalkenyl, alkylthioalkyl, alkoxyalkyl, alkylcarboalkyl, aminocarboalkyl, aryl, substituted aryl wherein said substituents can be selected from halogen, alkyl, alkoxy and thioalkyl; $R_1$ can be selected from the group consisting of hydrogen and lower alkyl; and $R^2$ can be selected from the group

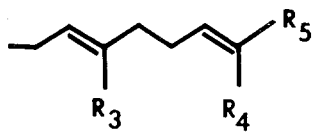

,

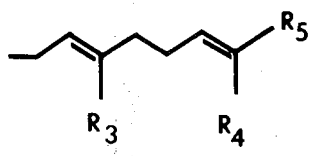

,

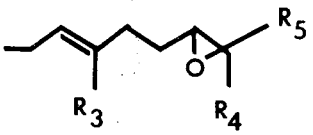 and

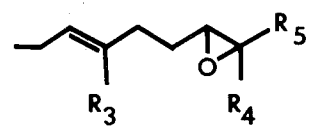

wherein $R_3$, $R_4$ and $R_5$ are independently selected from methyl and ethyl. These compounds are active insecticides which can be applied at any stage of their development.

11 Claims, No Drawings 3,888,888

INSECTICIDAL ACTIVE GERANYL AND CITRONYL AMINE DERIVATIVES AND THEIR EPOXIDES

This is a division of application Ser. No. 172,203, filed Aug. 16, 1971, now abandoned.

DESCRIPTION OF THE INVENTION

This invention is directed to a novel group of compounds which may be generally described as certain carbamates which are active insecticides. The compounds of the present invention are represented by the generic formula

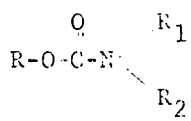

wherein R can be selected from the group consisting of lower alkyl having from about 3 to about 8 carbon atoms, alkenyl, haloalkenyl, alkylthioalkyl, alkoxyalkyl, alkylcarboalkyl, aminocarboalkyl, aryl, substituted aryl wherein said substituents can be selected from halogen, alkyl, alkoxy and thioalkyl; $R_1$ can be selected from the group consisting of hydrogen and lower alkyl; and $R_2$ can be selected from the group consisting of

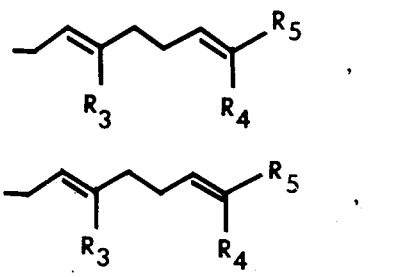

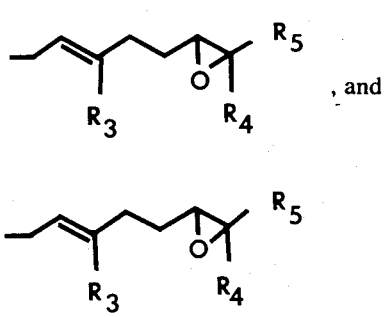

wherein $R_3$, $R_4$ and $R_5$ are independently selected from methyl and ethyl.

In general, the above compounds can be prepared by reacting a haloformate with an appropriate amine in the presence of a solvent such as methylene chloride. In order to achieve high yields, an acid acceptor such as triethylamine or pyridine is preferably employed, although other acid acceptors can be used. In the event that it is desired to form the epoxide derivative, the reaction product between the haloformate and appropriate amine is treated with any well known epoxidizing agent, such as metachloroperbenzoic acid. Other epoxidizing agents can be used and will be readily apparent to those skilled in the art. In particular, reference is made to Kirk Othmer Encyclopedia of Chemical Technology, 2nd Edition, 1965, Vol. 8, pp. 238–244, for a discussion of various types of epoxidizing agents.

It has been found that this class of compounds acts in a different manner on insects than presently used insecticides, and exerts a disrupting influence upon the normal development of the insects. These compounds impede the metamorphosis of the normal pupation of pest insects and result in the formation of members of the treated species which are non-viable or sterile. This ultimately leads, indirectly at least, to the destruction of a pest population.

Preparation of the compounds of this invention are illustrated by the following examples:

EXAMPLE 1

O-isobutyl N-geranylcarbamate

A mixture was formed containing 1.36 g. (0.01 moles) of isobutylchloroformate in 20 ml. of methylene chloride and cooled in an ice bath. Then, 0.8 g. of pyridine was added. Then, 1.5 g. (0.01 moles) of geranylamine in 5 ml. of methylene chloride was slowly added dropwise while the mixture was maintained in an ice bath for cooling. The mixture was stirred at room temperature overnight. Then, additional methylene chloride was added, the mixture was washed twice with water, dried over magnesium sulfate, filtered and stripped to provide 2.1 g. or product, $n_D^{30}$ — 1.4672.

EXAMPLE 2

Epoxide of O-isobutyl N-geranylcarbamate

A mixture was formed containing 0.5 g. (0.002 moles) of O-isobutyl N-geranylcarbamate in 10 ml. of methylene chloride and cooled in an ice bath. Then a solution of 0.002 moles of m-chloroperbenzoic acid in 10 ml. methylene chloride was slowly dropped in and the resulting mixture stirred at room temperature overnight. Then it was washed three times with a 10% sodium bicarbonate solution, dried over magnesium sulfate, filtered and stripped to provide a yield of 0.5 g., $n_D^{30}$ — 1.4625.

Other compounds can be prepared in an analogous manner starting with the appropriate materials as outlined above. The following is a table of compounds representative of those embodied by the present invention. Compound numbers have been assigned to them and are used for identification throughout the balance of the specification.

TABLE I

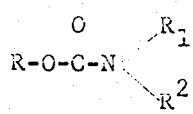

| Compound Number | R | R₁ | R₂ | R₃ | R₄ | R₅ |
|---|---|---|---|---|---|---|
| 1 | i—C$_3$H$_7$ | H | (geranyl-type chain with R$_3$, R$_4$, R$_5$) | CH$_3$ | CH$_3$ | CH$_3$ |
| 2 | n—C$_4$H$_9$ | H | (geranyl-type chain with R$_3$, R$_4$, R$_5$) | CH$_3$ | CH$_3$ | CH$_3$ |
| 3 | i—C$_4$H$_9$ | H | (geranyl-type chain with R$_3$, R$_4$, R$_5$) | CH$_3$ | CH$_3$ | CH$_3$ |
| 4 | sec—C$_4$H$_9$ | H | (geranyl-type chain with R$_3$, R$_4$, R$_5$) | CH$_3$ | CH$_3$ | CH$_3$ |
| 5 | Cl$_2$CHCH$_2$ | H | (geranyl-type chain with R$_3$, R$_4$, R$_5$) | CH$_3$ | CH$_3$ | CH$_3$ |
| 6 | CH$_2$=CHCH$_2$ | H | (geranyl-type chain with R$_3$, R$_4$, R$_5$) | CH$_3$ | CH$_3$ | CH$_3$ |
| 7 | CH$_3$CH=CHCH$_2$ | H | (geranyl-type chain with R$_3$, R$_4$, R$_5$) | CH$_3$ | CH$_3$ | CH$_3$ |
| 8 | CH$_3$—C—CH$_2$<br>    |<br>    CH$_3$ | H | (geranyl-type chain with R$_3$, R$_4$, R$_5$) | CH$_3$ | CH$_3$ | CH$_3$ |
| 9 | CH$_2$=C—CH$_2$<br>    |<br>    Cl | H | (geranyl-type chain with R$_3$, R$_4$, R$_5$) | CH$_3$ | CH$_3$ | CH$_3$ |
| 10 | CH$_3$SCH$_2$CH$_2$ | H | (geranyl-type chain with R$_3$, R$_4$, R$_5$) | CH$_3$ | CH$_3$ | CH$_3$ |
| 11 | C$_2$H$_5$OCH$_2$CH$_2$ | H | (geranyl-type chain with R$_3$, R$_4$, R$_5$) | CH$_3$ | CH$_3$ | CH$_3$ |
| 12 | C$_2$H$_5$—O—C(=O)—CH$_2$ | H | (geranyl-type chain with R$_3$, R$_4$, R$_5$) | CH$_3$ | CH$_3$ | CH$_3$ |
| 13 | (C$_2$H$_5$)$_2$—N—C(=O)—CH$_2$ | H | (geranyl-type chain with R$_3$, R$_4$, R$_5$) | CH$_3$ | CH$_3$ | CH$_3$ |

TABLE I—Continued

| Compound Number | R | $R_1$ | $R_2$ | $R_3$ | $R_4$ | $R_5$ |
|---|---|---|---|---|---|---|
| 14 | Cl-C₆H₄- | H | -CH=C(R₃)-CH₂-CH₂-CH=C(R₄)(R₅) | $CH_3$ | $CH_3$ | $CH_3$ |
| 15 | Br-C₆H₄- | H | -CH=C(R₃)-CH₂-CH₂-CH=C(R₄)(R₅) | $CH_3$ | $CH_3$ | $CH_3$ |
| 16 | $CH_3$-C₆H₄- | H | -CH=C(R₃)-CH₂-CH₂-CH=C(R₄)(R₅) | $CH_3$ | $CH_3$ | $CH_3$ |
| 17 | $C_2H_5$-C₆H₄- | H | -CH=C(R₃)-CH₂-CH₂-CH=C(R₄)(R₅) | $CH_3$ | $CH_3$ | $CH_3$ |
| 18 | $i$-$C_3H_5$-C₆H₄- | H | -CH=C(R₃)-CH₂-CH₂-CH=C(R₄)(R₅) | $CH_3$ | $CH_3$ | $CH_3$ |
| 19 | $CH_3$O-C₆H₄- | H | -CH=C(R₃)-CH₂-CH₂-CH=C(R₄)(R₅) | $CH_3$ | $CH_3$ | $CH_3$ |
| 20 | $CH_3$S-C₆H₄- | H | -CH=C(R₃)-CH₂-CH₂-CH=C(R₄)(R₅) | $CH_3$ | $CH_3$ | $CH_3$ |
| 21 | 2,4-Cl₂-C₆H₃- | H | -CH=C(R₃)-CH₂-CH₂-CH=C(R₄)(R₅) | $CH_3$ | $CH_3$ | $CH_3$ |
| 22 | Cl-C₆H₄-$CH_2$- | H | -CH=C(R₃)-CH₂-CH₂-CH=C(R₄)(R₅) | $CH_3$ | $CH_3$ | $CH_3$ |
| 23 | $i$-$C_3H_7$ | H | -CH=C(R₃)-CH₂-CH₂-CH(–O–)C(R₄)(R₅) | $CH_3$ | $CH_3$ | $CH_3$ |
| 24 | $n$-$C_4H_9$ | H | -CH=C(R₃)-CH₂-CH₂-CH(–O–)C(R₄)(R₅) | $CH_3$ | $CH_3$ | $CH_3$ |
| 25 | $i$-$C_4H_9$ | H | -CH=C(R₃)-CH₂-CH₂-CH(–O–)C(R₄)(R₅) | $CH_3$ | $CH_3$ | $CH_3$ |
| 26 | sec-$C_4H_9$ | H | -CH=C(R₃)-CH₂-CH₂-CH(–O–)C(R₄)(R₅) | $CH_3$ | $CH_3$ | $CH_3$ |
| 27 | $Cl_2CHCH_2$ | H | -CH=C(R₃)-CH₂-CH₂-CH(–O–)C(R₄)(R₅) | $CH_3$ | $CH_3$ | $CH_3$ |

TABLE I—Continued

| Compound Number | R | $R_1$ | $R_2$ | $R_3$ | $R_4$ | $R_5$ |
|---|---|---|---|---|---|---|
| 28 | $CH_2=CHCH_2$ | H | $\phantom{XX}$/\=/\\/epoxide with $R_3, R_4, R_5$ | $CH_3$ | $CH_3$ | $CH_3$ |
| 29 | $CH_3CH=CHCH_2$ | H | ″ | $CH_3$ | $CH_3$ | $CH_3$ |
| 30 | $CH_3\underset{\underset{CH_3}{\|}}{C}-CH_2$ | H | ″ | $CH_3$ | $CH_3$ | $CH_3$ |
| 31 | $CH_2=\underset{\underset{Cl}{\|}}{C}-CH_2$ | H | ″ | $CH_3$ | $CH_3$ | $CH_3$ |
| 32 | $CH_3SCH_2CH_2$ | H | ″ | $CH_3$ | $CH_3$ | $CH_3$ |
| 33 | $C_2H_5OCH_2CH_2$ | H | ″ | $CH_3$ | $CH_3$ | $CH_3$ |
| 34 | $C_2H_5-O-\underset{\underset{O}{\|\|}}{C}-CH_2$ | H | ″ | $CH_3$ | $CH_3$ | $CH_3$ |
| 35 | $(C_2H_5)_2-N-\underset{\underset{O}{\|\|}}{C}-CH_2$ | H | ″ | $CH_3$ | $CH_3$ | $CH_3$ |
| 36 | $Cl-C_6H_4-$ | H | ″ | $CH_3$ | $CH_3$ | $CH_3$ |
| 37 | $Br-C_6H_4-$ | H | ″ | $CH_3$ | $CH_3$ | $CH_3$ |
| 38 | $CH_3-C_6H_4-$ | H | ″ | $CH_3$ | $CH_3$ | $CH_3$ |
| 39 | $C_2H_5-C_6H_4-$ | H | ″ | $CH_3$ | $CH_3$ | $CH_3$ |
| 40 | $i\text{-}C_3H_5-C_6H_4-$ | H | ″ | $CH_3$ | $CH_3$ | $CH_3$ |

TABLE I—Continued

| Compound Number | R | $R_1$ | $R_2$ | $R_3$ | $R_4$ | $R_5$ |
|---|---|---|---|---|---|---|
| 41 | 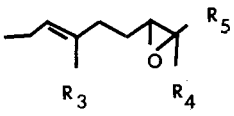 | H | 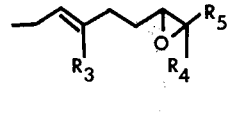 | $CH_3$ | $CH_3$ | $CH_3$ |
| 42 | 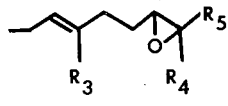 | H | 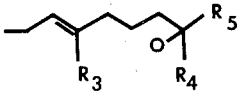 | $CH_3$ | $CH_3$ | $CH_3$ |
| 43 | 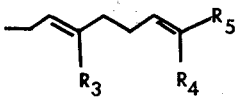 | H | 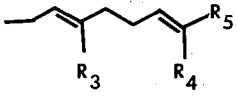 | $CH_3$ | $CH_3$ | $CH_3$ |
| 44 | 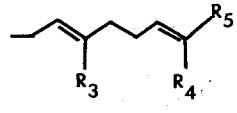 | H | 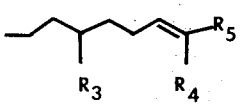 | $CH_3$ | $CH_3$ | $CH_3$ |
| 45 | $C_2H_5$ | $C_2H_5$ | 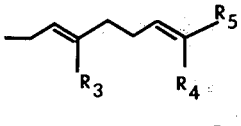 | $CH_3$ | $CH_3$ | $CH_3$ |
| 46 | $C_2H_5$ | $CH_3$ | | $CH_3$ | $CH_3$ | $CH_3$ |
| 47 | $C_2H_5$ | $C_2H_5$ | | $C_2H_5$ | $C_2H_5$ | $CH_3$ |
| 48 | $C_2H_5$ | $C_2H_5$ | 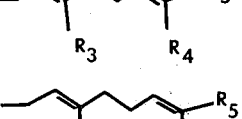 | $CH_3$ | $CH_3$ | $CH_3$ |
| 49 | i—$C_3H_7$ | $CH_2CN$ | | $CH_3$ | $CH_3$ | $CH_3$ |
| 50 | $CH_3$ | $CH_2CH=CH_2$ | | $CH_3$ | $CH_3$ | $CH_3$ |
| 51 | $CH_3$ | $CH_2C \equiv CH$ | | $CH_3$ | $CH_3$ | $CH_3$ |
| 52 | $CH_3$ | $CH_2OCH_3$ | | $CH_3$ | $CH_3$ | $CH_3$ |
| 53 | $CH_3—C \equiv C—CH_2$ | $C_2H_5$ | | $CH_3$ | $CH_3$ | $CH_3$ |
| 54 | 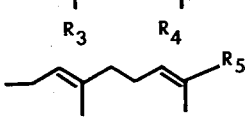 | H | 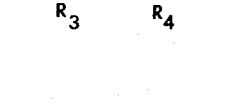 | $CH_3$ | $CH_3$ | $CH_3$ |

TABLE I — Continued

| Compound Number | R | $R_1$ | $R_2$ | $R_3$ | $R_4$ | $R_5$ |
|---|---|---|---|---|---|---|
| 55 | $ClCH_2CH_2$ | $CH_3$ | ![diene with $R_3$, $R_4$, $R_5$] | $CH_3$ | $CH_3$ | $CH_3$ |
| 56 | $C_2H_5$ | $C_2H_5$ | ![epoxide with $R_3$, $R_4$, $R_5$] | $CH_3$ | $CH_3$ | $CH_3$ |
| 57 | $C_2H_5$ | $CH_3$ | ![epoxide with $R_3$, $R_4$, $R_5$] | $CH_3$ | $CH_3$ | $CH_3$ |
| 58 | $C_2H_5$ | $C_2H_5$ | ![epoxide with $R_3$, $R_4$, $R_5$] | $C_2H_5$ | $C_2H_5$ | $CH_3$ |
| 59 | $C_2H_5$ | $C_2H_5$ | ![epoxide with $R_3$, $R_4$, $R_5$] | $CH_3$ | $CH_3$ | $CH_3$ |
| 60 | $i-C_3H_7$ | $CH_2CN$ | ![epoxide with $R_3$, $R_4$, $R_5$] | $CH_3$ | $CH_3$ | $CH_3$ |
| 61 | $CH_3$ | $CH_2CH=CH_2$ | ![epoxide with $R_3$, $R_4$, $R_5$] | $CH_3$ | $CH_3$ | $CH_3$ |
| 62 | $CH_3$ | $CH_2C\equiv CH$ | ![epoxide with $R_3$, $R_4$, $R_5$] | $CH_3$ | $CH_3$ | $CH_3$ |
| 63 | $CH_3$ | $CH_2OCH_3$ | ![epoxide with $R_3$, $R_4$, $R_5$] | $CH_3$ | $CH_3$ | $CH_3$ |
| 64 | $CH_3-C\equiv C-CH_2$ | $C_2H_5$ | ![epoxide with $R_3$, $R_4$, $R_5$] | $CH_3$ | $CH_3$ | $CH_3$ |
| 65 | cyclohexyl- | H | ![epoxide with $R_3$, $R_4$, $R_5$] | $CH_3$ | $CH_3$ | $CH_3$ |
| 66 | $ClCH_2CH_2$ | $CH_3$ | ![epoxide with $R_3$, $R_4$, $R_5$] | $CH_3$ | $CH_3$ | $CH_3$ |

INSECTICIDAL EVALUATION TEST

The degree of activity of a candidate compound to hinder or impede the metamorphosis of insects is measured by treating the early pupal stage of a representative insect with the compound and examining it after its last molt toward the adult form for retention of immature features.

Specifically, yellow mealworm, Tenebrio molitor, L. larvae are maintained at 28°C. and 40% humidity on a diet of bran flakes. Prepupae are collected from the culture and kept in separate containers. The pupae, collected once daily, are 1–25 hours old at the time of treatment. By means of a syringe, suitable amounts of candidate compounds in 0.5 or 1.0 µl of acetone are applied to the venter of Tenebrio molitor, L. pupae. Treated pupae are maintained at 28°C. and 40% humidity until the adults emerged (usually within 6–8 days). Emerged adults are graded as positive, negative, or dead. To be considered a positive response, the presence of typical pupal cuticle, urogomphi, gin trap, and abnormal wings, etc., are required. For each test, 2 groups of 20 pupae were used and the averaged results were reported.

The dose of a candidate compound per pupa that is needed to kill or give a positive response in the above insecticidal evaluation test for 10 of the 20 pupae is determined. Table II shows these doses under the column $ED_{50}$.

TABLE II

| Compound Number | $ED_{50}$- µg/pupa |
|---|---|
| 3 | 10 |
| 25 | 0.5 |
| 6 | >10 |
| 28 | 2 |

The compounds of this invention are generally embodied into a form suitable for convenient application. For example, the compounds can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc., upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as light or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition for example, an emulsion, suspension, or aerosol spray. While the concentration of the active pesticide in the present compositions can vary within rather wide limits, ordinarily the pesticide compound will comprise not more than about 15.0% by weight of the compositions. Preferably, however, the pesticide compositions of this invention will be in the form of solutions or suspensions containing about 0.1 to 1.0% by weight of the active pesticide compound.

What is claimed is:

1. A compound having the formula:

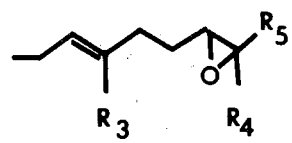

wherein R is selected from the group consisting of cyclohexyl and substituted phenyl wherein said substituents can be selected from halogen, lower alkyl, lower alkoxy and lower thioalkyl; $R_1$ is hydrogen; and $R^2$ is

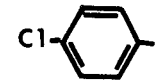

wherein $R_3$, $R_4$ and $R_5$ are independently selected from methyl and ethyl.

2. A compound as set forth in claim 1 wherein R is

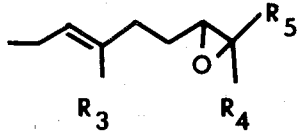

$R_1$ is H, $R_2$ is

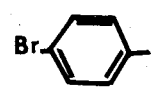

$R_3$ is $CH_3$, $R_4$ is $CH_3$, and $R_5$ is $CH_3$.

3. A compound as set forth in claim 1 wherein R is

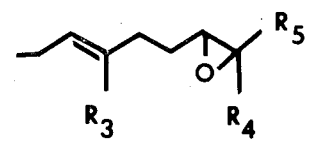

$R_1$ is H, $R_2$ is $R_3$ is $CH_3$, $R_4$ is $CH_3$, and $R_5$ is $CH_3$.

4. A compound as set forth in claim 1 wherein R is

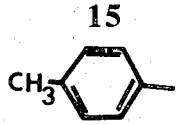

R₁ is H, R₂ is

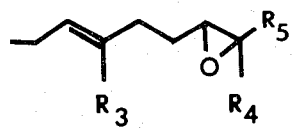

R₃ is CH₃, R₄ is CH₃, and R₅ is CH₃.

5. A compound as set forth in claim 1 wherein R is

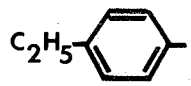

R₁ is H, R₂ is

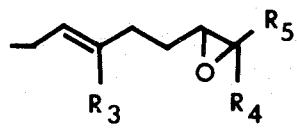

R₃ is CH₃, R₄ is CH₃, and R₅ is CH₃.

6. A compound as set forth in claim 1 wherein R is

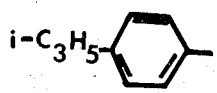

R₁ is H, R₂ is

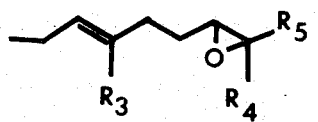

R₃ is CH₃, R₄ is CH₃, and R₅ is CH₃.

7. A compound as set forth in claim 1 wherein R is

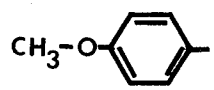

R₁ is H, R₂ is

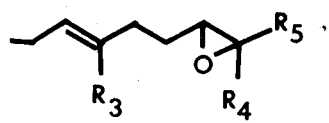

R₃ is CH₃, R₄ is CH₃, and R₅ is CH₃.

8. A compound as set forth in claim 1 wherein R is

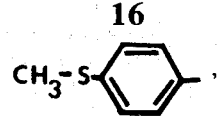

R₁ is H, R₂ is

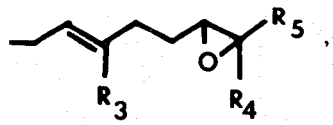

R₃ is CH₃, R₄ is CH₃, and R₅ is CH₃.

9. A compound as set forth in claim 1 wherein R is

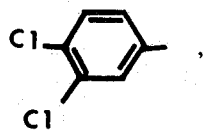

R₁ is H, R₂ is

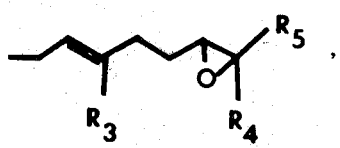

R₃ is CH₃, R₄ is CH₃, and R₅ is CH₃.

10. A compound as set forth in claim 1 wherein R is

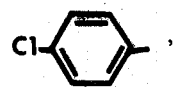

R₁ is H, R₂ is

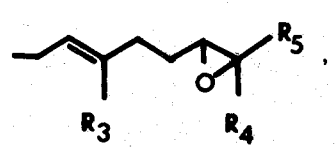

R₃ is CH₃, R₄ is CH₃, and R₅ is CH₃.

11. A compound as set forth in claim 1 wherein R is

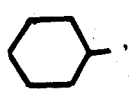

R₁ is H, R₂ is

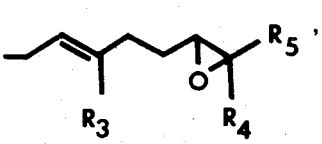

R₃ is CH₃, R₄ is CH₃, and R₅ is CH₃.

* * * * *

UNITED STATES PATENT OFFICE
CERTIFICATE OF CORRECTION

PATENT NO. : 3,888,888
DATED : June 10, 1975
INVENTOR(S) : Ferenc M. Pallos and Julius J. Menn It is certified that error appears in the above-identified patent and that said Letters Patent are hereby corrected as shown below:

In the Abstract, the formula (1st instance) should read:

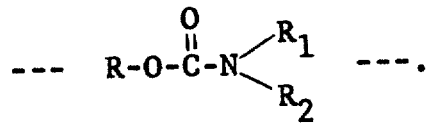

In the Abstract, 8th line following the 1st formula, after the word "group", add ---consisting of---.

Immediately after the 1st line of Claim 1, the following formula should be added:

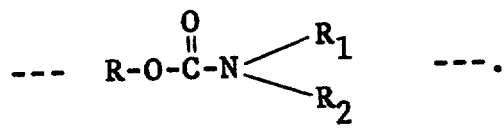

Signed and Sealed this

Fifteenth Day of February 1977

[SEAL]

Attest:

RUTH C. MASON
Attesting Officer

C. MARSHALL DANN
Commissioner of Patents and Trademarks